United States Patent
Nanjunda Swamy

(10) Patent No.: US 10,482,911 B1
(45) Date of Patent: Nov. 19, 2019

(54) MULTIPLE-ACTUATOR DRIVE THAT PROVIDES DUPLICATION USING MULTIPLE VOLUMES

(71) Applicant: Seagate Technology LLC, Cupertino, CA (US)

(72) Inventor: Vijay Nanjunda Swamy, Bangalore (IN)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 16/102,210

(22) Filed: Aug. 13, 2018

(51) Int. Cl.
| G11B 5/09 | (2006.01) |
| G11B 5/55 | (2006.01) |
| G06F 3/06 | (2006.01) |
| G11B 20/12 | (2006.01) |
| G06F 11/20 | (2006.01) |
| G11B 5/48 | (2006.01) |

(52) U.S. Cl.
CPC ............ *G11B 5/5578* (2013.01); *G06F 3/065* (2013.01); *G06F 3/0619* (2013.01); *G06F 11/2084* (2013.01); *G06F 11/2087* (2013.01); *G11B 5/4813* (2013.01); *G11B 20/1217* (2013.01)

(58) Field of Classification Search
None
See application file for complete search history.

(56) References Cited

U.S. PATENT DOCUMENTS

| 4,577,240 A | 3/1986 | Hedberg et al. |
| 4,751,596 A | 6/1988 | Rohart |
| 4,823,196 A | 4/1989 | Goddard |
| 4,972,396 A | 11/1990 | Rafner |
| 5,081,552 A | 1/1992 | Glaser et al. |
| 5,223,993 A | 6/1993 | Squires et al. |
| 5,293,282 A | 3/1994 | Squires et al. |
| 5,343,347 A | 8/1994 | Gilovich |
| 5,355,486 A | 10/1994 | Cornaby |
| 5,523,901 A | 6/1996 | Anderson |
| 6,057,990 A | 5/2000 | Gilovich |
| 6,081,399 A | 6/2000 | Lee et al. |
| 6,317,282 B1 | 11/2001 | Nam |
| 6,483,654 B2 | 11/2002 | Nam |
| 6,502,178 B1 | 12/2002 | Olbrich |
| 6,658,201 B1 | 12/2003 | Rebalski |
| 6,690,549 B1 | 2/2004 | Aikawa et al. |
| 6,735,032 B2 | 5/2004 | Dunn et al. |

(Continued)

OTHER PUBLICATIONS

U.S. Appl. No. 15/939,493, filed Mar. 29, 2018.
U.S. Appl. No. 15/939,502, filed Mar. 29, 2018.
U.S. Appl. No. 15/844,774, filed Dec. 18, 2017.

*Primary Examiner* — Peter Vincent Agustin
(74) *Attorney, Agent, or Firm* — Mueting, Raasch & Gebhardt, P.A.

(57) ABSTRACT

A first drive volume formed on a disk within a drive enclosure. The first drive volume is read from and written to by a first head that is moved by a first actuator, A second drive volume is formed on the one or more disks. The second volume is read from and written to by a second head that is moved via a second actuator within the drive enclosure. The second actuator is separate and independent from the first actuator. Data of the first drive volume is duplicated onto the second drive volume, Background validation operations are performed on the second drive volume instead of the first volume.

20 Claims, 5 Drawing Sheets

(56) References Cited

U.S. PATENT DOCUMENTS

| | | | |
|---|---|---|---|
| 6,883,062 B2 | 4/2005 | Susnjar | |
| 7,102,842 B1 | 9/2006 | Howard | |
| 7,146,623 B2 | 12/2006 | Kuwajima et al. | |
| 7,315,429 B2 | 1/2008 | van Zyl | |
| 7,379,257 B2 | 5/2008 | Yamagishi | |
| 7,385,781 B1 | 6/2008 | Craig et al. | |
| 7,430,091 B2 | 9/2008 | Manasse | |
| 7,679,851 B1 | 3/2010 | Sun et al. | |
| 7,710,683 B2 | 5/2010 | Craig et al. | |
| 8,010,836 B2* | 8/2011 | Fukui | G06F 11/2082 714/6.3 |
| 8,233,451 B2 | 7/2012 | Breslau et al. | |
| 8,351,147 B2 | 1/2013 | Breslau et al. | |
| 9,319,067 B2* | 4/2016 | Uchiyama | H03M 13/09 |
| 9,830,938 B1 | 11/2017 | Hamilton | |
| 2004/0107325 A1* | 6/2004 | Mori | G06F 3/0605 711/162 |
| 2004/0179465 A1 | 9/2004 | Kuwajima et al. | |
| 2006/0031594 A1* | 2/2006 | Kodama | G06F 11/2058 710/5 |
| 2007/0005542 A1* | 1/2007 | Echeverria | G06N 5/02 706/47 |
| 2007/0094467 A1* | 4/2007 | Yamasaki | G06F 11/2082 711/162 |
| 2007/0297083 A1 | 12/2007 | van Zyl | |
| 2008/0123213 A1 | 5/2008 | Craig et al. | |
| 2008/0162813 A1 | 7/2008 | Haustein et al. | |
| 2008/0239554 A1 | 10/2008 | Takeda et al. | |
| 2012/0250177 A1 | 10/2012 | Somanache et al. | |
| 2013/0061013 A1* | 3/2013 | Tokoro | G06F 11/1076 711/162 |
| 2014/0351545 A1* | 11/2014 | Nakajima | G06F 3/0607 711/170 |
| 2017/0132059 A1* | 5/2017 | Virmani | G06F 11/079 |
| 2017/0168908 A1 | 6/2017 | Abali et al. | |
| 2018/0174613 A1 | 6/2018 | Zhu et al. | |

* cited by examiner

MULTIPLE-ACTUATOR DRIVE THAT PROVIDES DUPLICATION USING MULTIPLE VOLUMES

SUMMARY

The present disclosure is directed to a multiple-actuator that provides duplications using multiple volumes. In one embodiment, a first drive volume of one or more disks within a drive enclosure is formed. The first drive volume is read from and written to by a first read/write head that is moved by a first actuator within the drive enclosure. A second drive volume of the one or more disks is formed that that is read from and written to by a second read/write head that is moved via a second actuator within the drive enclosure. The second actuator is separate and independent from the first actuator. Data of the first drive volume is duplicated onto the second drive volume. Background validation operations are performed on the second drive volume instead of the first volume.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

Figure 1:
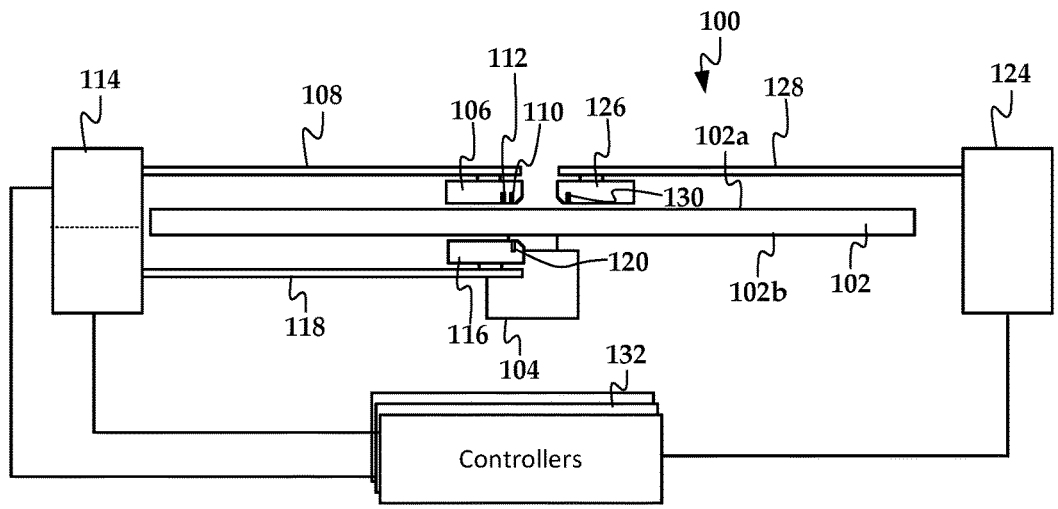
FIG. 1 is a diagram of a multiple actuator drive according to an example embodiment.

The present disclosure generally relates to data storage devices that utilize magnetic storage media, e.g., hard disk drives (HDDs). Additional HDD features described herein (generally described as "parallelism" architectures) are seen as a way to increase HDD performance measures such as data throughput and latency. Generally, parallelism architectures operate multiple read/write heads in parallel. Such parallelism can increase the rate of input/output operations (IOPS) and thereby speed up certain operations. For example, the data read from two heads can be combined together into a single stream, thereby doubling the throughput rate of data sent to the host. In other examples, different heads can service different read or write requests at the same time, thereby reducing overall latency, e.g., for multiple simultaneous random data access requests.

In embodiments described below, a hard disk drive includes multiple heads driven by different actuators that can read from or write to one or more disks simultaneously. This may include separate and independent reading/writing, such as heads that are servicing different read/write requests. This may also include separate and dependent reading/writing, e.g., where parts of a single stream of data are being handled by different heads at the same time. In either case, the head and actuators themselves are operating independently, although in coordination in the latter case. The parallelism architectures may be extended to other components that operate in the HDD, including system controllers, servo controllers, read/write channels, host interfaces, caches, etc.

While parallelism is generally considered a technique to increase data throughput, as described below it may also be used to increase reliability while minimizing performance impacts. For example, drives may lose data due to errors affecting a read/write head and/or the recording medium. In a storage array using redundancy such as redundant array of independent disks (RAID), multiple disk drives are assembled to form a logical volume with redundant data stored on some of the disks in some RAID configurations. The redundant data can be used to reconstruct data lost due to media/head errors. Because of the very large storage capacity of modern drives, the time it takes to reconstruct the data can be significant, hours or even days. As such, it is possible that another drive of the array fails when a disk reconstruction is taking place. Depending on the type of RAID volume, this can still result in a loss of data.

One way to mitigate data loss is to do a data scrub of the disks. Generally, this involves reading previously written data and checking for errors. This can be used to find and repair errors, or to find predictors of future errors, such as high error rate upon reading the data. In either case, the data that is lost (unrecoverable) can be recovered, e.g., from RAID redundancy data, and rewritten in the same or different location. Usually drive-level or disk-group-level scrubs are slow and are run as low priority. Often these scrubs are disabled by users since it degrades system performance and comes at a cost.

In embodiments described below, a drive have parallelism features that allows forming duplicate volumes within an individual drives. Some parallelism features, such as dual actuators, can allow the drive to operate as two, independent drive portions. These drive portions can be used to provide redundancy similar to RAID, but using only a single drive. One actuator (and a portion of the disks associated with this actuator) can be used as a primary drive and another actuator (and disk portions associated with this actuator) used for redundancy. Data can be duplicated between the two drive portions, either fully (e.g., each byte of data on the primary is written on the backup) or by using a parity or compression scheme (e.g., a reduced form of each byte of data of the primary is written to the backup). The drive portions are also referred to herein as "volumes," however both drive portions do not need to be presented to a host as a volume. For example, the host computer may, in some configurations, only have access via the host interface to the primary disk portion, which the host can use as a raw partition that can be divided into one or more volumes. Invisible to the host, the drive controller can internally manage the backup disk portion and duplicate the data of the primary onto this backup portion. The backed up data may include partition metadata, filesystem metadata, user data, parity data, etc.

In FIG. 1, a diagram illustrates an apparatus 100 (e.g., data storage drive) with parallelism features according to example embodiments. The apparatus 100 includes at least one magnetic disk 102 driven by a spindle motor 104. A slider 106 (also referred to as a head, read/write head, read head, write head, recording head, etc.) is held over a first surface 102a of the disk 102 by an arm 108. An actuator 114 moves (e.g., rotates) the arm 108 to place the slider 106 over different tracks on the disk 102. The slider includes a read transducer 110 and/or a write transducer 112. The read transducer 110 provides a signal in response to changing magnetic fields on the disk 102, and is coupled to a controller (not shown) where the separate signals are independently processed. The write transducer 112 receives signals from the controller and converts them to magnetic fields that change magnetic orientations of regions on the disk 102.

The apparatus 100 includes a second slider 116 supported by a second arm 118. The second slider 116 is held over a second surface 102b of the disk 102 and actuator 114 causes the second arm 118 to move to different tracks on the disk 102. The arm 118 may move together with arm 108, or the arms 108, 118 may move independently (as indicated by dashed line on actuator 114 indicating a split actuator). In either configuration, the arms 108, 118 rotate around the same axis. The slider 116 also includes read and/or write transducers 120. The transducers 120 are capable of reading from and/or writing to disk surface 102b simultaneously with one or both of read/write transducers 110, 112 that access disk surface 102a.

In another embodiment, the apparatus 100 includes a third slider 126 supported by a third arm 128. The third slider 126 (and its associated actuation hardware) may be included instead of or in addition to the second slider 116 and its associated actuation hardware). The third slider 126 is held over the first surface 102a of the disk 102 as a second actuator 124 causes the third arm 118 to move to different tracks on the disk 102. The arm 128 and actuator 124 move independently of arm 108 and actuator 114. The slider 126 includes read and/or write transducers 130. The transducers 130 are capable of reading from and/or writing to the same disk surface 102a simultaneously with transducers 110, 112 of first slider 106.

In the examples shown in FIG. 1, more than one disk 102 may be used, and the actuators 114, 124 may be coupled to additional arms and heads that simultaneously access some or all of the additional disk surfaces. In this context, "accessing" generally refers to electrically activating a read or write transducer and coupling the transducer to a read/write channel to facilitate reading from and writing to the disk. Independently movable heads that utilize a split actuator 114 may generally simultaneously access different surfaces, e.g., heads 106 and 116 access different surfaces 102a, 102b at the same time. Independently movable heads that utilize non-coaxial actuators 114, 124 may access the same surface at the same time, e.g., heads 106 and 126 may both access surface 102a at the same time.

One or more controllers 132 are coupled to the respective actuators 114, 124 and control movement of the actuators 114, 124. The controllers 132 may include systems on a chip that perform such operations as servo control, encoding and decoding of data written to and read from the disk 102, queuing and formatting host commands, etc. If more than one controller 132 is used, the multiple controllers 132 may have the ability to execute multiple media read/write operations concurrently.

Figure 2:
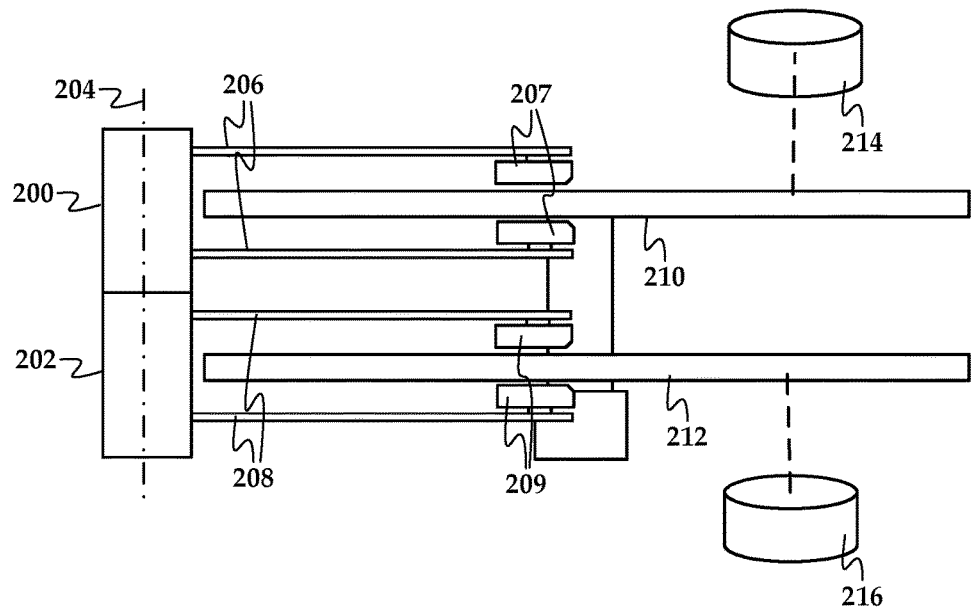
FIG. 2 is a diagram showing a drive volume configuration with a split actuator according to an example embodiment.

As noted above, the apparatus 100 in FIG. 1 is configured to provide two different volumes, one storing redundancy data for the other. Such a drive may be configured in a number of ways, such as shown in the block diagrams of FIGS. 2, 3, and 4. In FIG. 2, a block diagram shows two actuators 200, 202 that rotate about a common axis 204 according to an example embodiment. This may be considered a single, split actuator having two independently movable sections 200, 202. In either case, the actuators 200, 202 independently move arms 206, 208 and heads 207, 209 that are respectively dedicated to entire surfaces of different disks 210, 212. In this example, both sides of disk 210 may be configured as a primary volume 214, and both sides of disk 212 as a backup volume 216.

In one embodiment, the volumes 214, 216 may be the same size. In such a case, the volumes 214, 216 may be sector-by-sector mirrors of one another. In other embodiments, the formatting (e.g., filesystem, compression, etc.) and arrangement of the volumes 214, 216 may be different, and in such a case the volumes 214, 216 may be different from one another. For example, the primary volume 214 may be stored on three disks accessed via a first actuator, and the secondary volume 216 may be stored on two disks accessed via a second actuator. At least the primary volume 214 can be directly accessed via a host computer, and the backup volume 216 may or may not be host-accessible.

Figure 3:
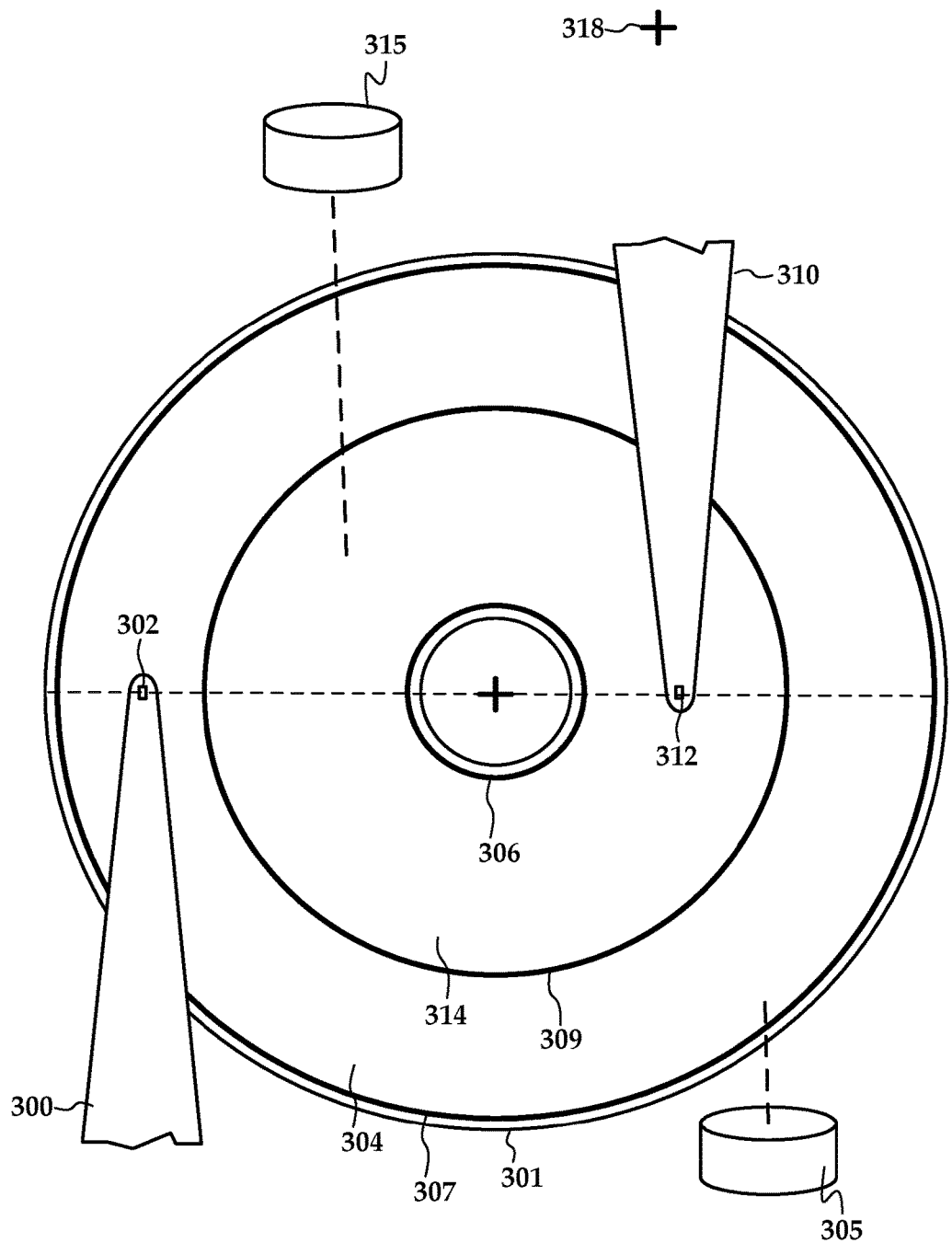
FIG. 3 is a diagram showing a drive volume configuration on a single disk surface according to an example embodiment.

In FIG. 3, a diagram illustrates a multiple-actuator drive configuration according to another example embodiment. In this example, arms 300, 310 are driven by different actuators (not shown) and move first and second heads 302, 312 across one surface of a disk 301. The arms 300, 310 rotate about different axes 308, 318 such that both heads 302, 312 can access the disk surface at the same time. Head 302 is configured to read tracks at least from a first zone 304 of the disk 301. Head 312 is configured to read tracks at least from a second zone 314. A middle diameter 309 is used as a delimiter between the first and second zones 304, 314, and need not lie exactly in the middle (e.g., halfway) between an inner diameter 306 and outer diameter 307.

The radially-defined zones 304, 314 are used to store respective volumes 305, 315, one of which can be the primary and the other a backup. In one embodiment, the volumes 305, 315 may be the same size, e.g., having the same number of sectors. In such a case, the volumes 305, 315 may be sector-by-sector mirrors of one another. In other embodiments, the volumes 305, 315 may be different sizes from one another. In some configurations, the formatting (e.g., filesystem, compression, etc.) and arrangement of the volumes 305, 315 may be different. At least the primary volume can be directly accessed via a host computer, and the backup volume may or may not be host-interface-accessible.

Note that in the arrangement shown in FIG. 3, the actuators 300, 310 and heads may be capable of accessing both zones 304, 314 at any given time. This may be used to increase performance under some conditions. For example, both heads 302, 312 may be configured to service a read request in parallel, increasing the throughput (measured in TOPS) of the read request. Similarly, both heads 302, 312 may be able to service the same write request to the one of the volumes 305, 315 under some conditions, e.g., assuming that the device has provisions (e.g., a backup process that runs in the background) to write this data a second time to whichever of the volumes 305, 315 is designated as the backup volume.

The arrangement shown in FIG. 3 can be repeated for multiple disk surfaces of one or more disks, each surface having its own arm and head driven by the same actuators that drive the illustrated arms 300, 310 and heads 302, 312. Also, more than two head-actuator assemblies (e.g., three, four, etc.) may be used for each disk surface, each head-actuator assembly dedicated to a different zone. The arrangement shown in FIG. 3 can be combined with that of FIG. 2, such that at least one of two or more actuators with different pivots 308, 318 is split such that portions of the split actuators can independently access different disks at the same time.

Note that the zones 304, 314 are in different radial locations in this example. In some configurations, each head 302, 312 may be dedicated to just one zone. This may provide some advantages, such as decreasing the maximum skew range of the heads 302, 312 and being able to optimize each head 302, 312 for particular zone geometry and format (e.g., track spacing, bit density). One challenge in such an arrangement is that the performance (e.g., sequential read/write throughput) of the zones 304, 314 may differ, as tracks in the outer zone 304 will move at a higher speed relative to the heads 302, 312 than tracks of the inner zone 304. For example, if the volumes 305, 315 are arranged as mirrors that are simultaneously updated when data is being written, there may be a significant difference in write performance between the zones 304, 314. This difference into performance can be addressed in the system design, e.g., by allowing for a large buffer of write operations for the slower zone, slowing down transfers to the faster zone, etc. In other arrangements, e.g., where the volumes 305, 315 are of different size and/or data formats, this difference in performance may not significantly impact performance. For example, if data is compressed for backups into the slower zone, it may take less time to write the data to that zone.

Figure 4:
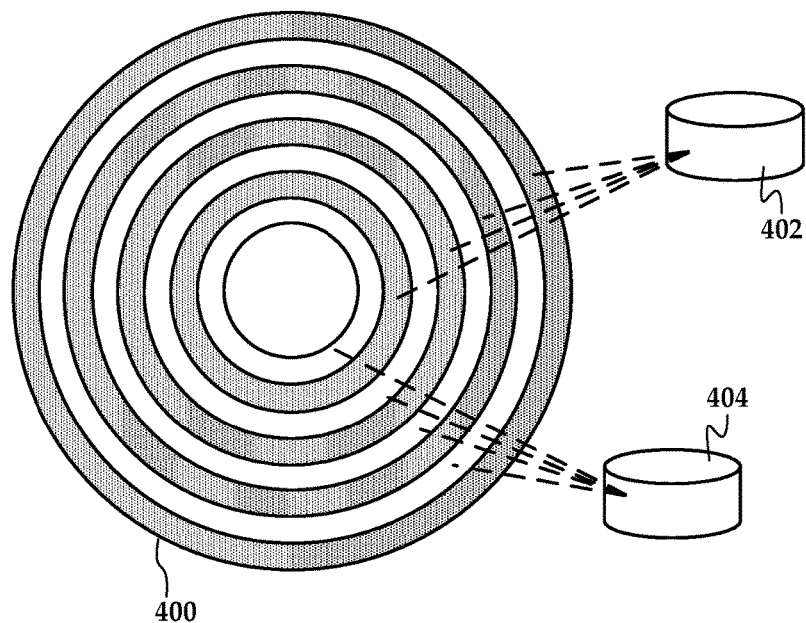
FIG. 4 is a diagram showing drive volume configuration on a single disk surface according to another example embodiment.

In some arrangements, it may be preferable to have two or more radially defined zones on a disk surface with approximately equal performance. A zone arrangement according to an example embodiment that can mitigate performance differences is shown in FIG. 4. A disk 400 is divided into four or more zones divided into two sets. In this example, eight zones are shown (each set indicated by shaded and unshaded rings), although in practice fewer or more may be used. These zones are accessed by different actuators in an arrangement similar to what is shown in FIG. 3. The shaded zones are assigned to one volume 402 while the unshaded zones are assigned to a different volume 404. Because the zones for both volumes 402, 404 are distributed and interleaved from the inner diameter to the outer diameter, performance differences between the volumes 402, 404 will be reduced as both volumes will have some high speed and some low speed zones. This will generally involve both of the heads traversing nearly the full skew range of the disk 100 in order to access the zones, and so the head and servo will be designed appropriately.

In other arrangements, a drive with two or more actuators with different rotation axes may still utilize full disk surfaces for drive volumes. In reference again to FIG. 3, arms 300, 310 may be part of a multiple arm stack with 2*N arms configured to read N disks. In such an arrangement, the first volume 305 may include the entire top surface of the illustrated disk 301. The second volume 315 may instead encompass the bottom surface of the disk 301, not visible in the figure. Another arm (not shown) that is coupled to the same actuator as arm 310 will access this second volume using a head that reads the bottom surface. This can be repeated for multiple disks, such that for N disks, N surfaces are dedicated to the first volume 305 and N surfaces are dedicated to the second volume. This can be used to create unequal volumes as well, e.g., N+1 surfaces being dedicated to the first volume 305 and N−1 surfaces being dedicated to the second volume.

Figure 5:
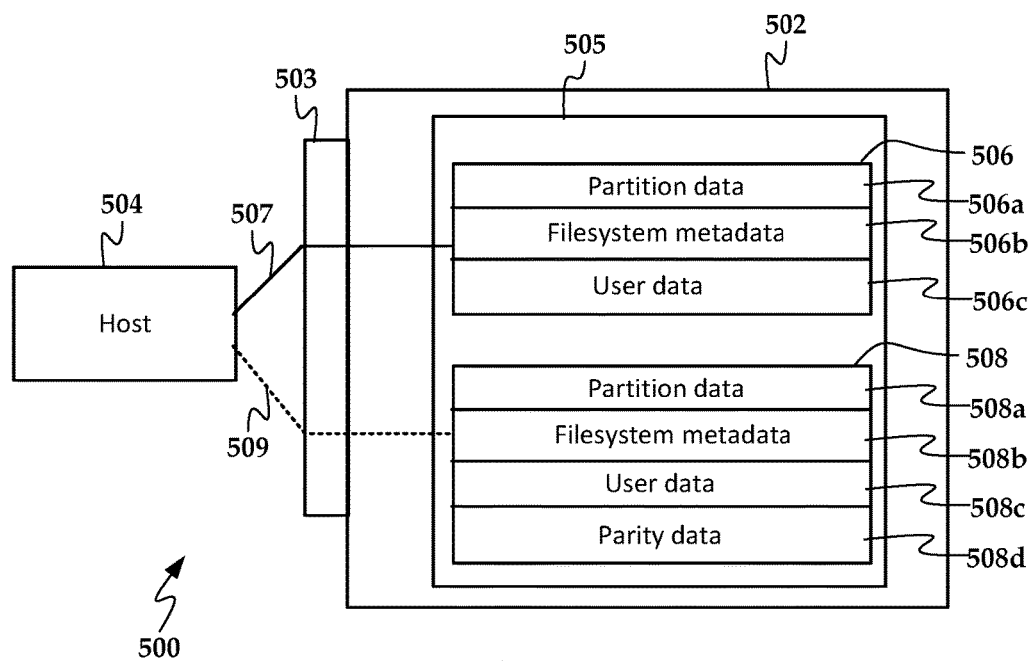
FIG. 5 is a diagram showing a logical configuration of drive volumes according to an example embodiment.

In FIG. 5, a block diagram shows a logical view of a system 500 and apparatus 502 according to an example embodiment. The system 500 may include a host 504 such as a general-purpose computer and/or storage controller card. The host 504 is coupled to the apparatus 502 via a host interface 503. The host interface 503 includes the electrical circuits and protocols used in host-to-drive communication. Example host interface standards include SATA, NVMe, SAS, SCSI, etc.

The host interface 503 allows the apparatus 502 to be used with industry standard drive controllers and motherboards. Further, an enclosure of the apparatus 502 may have a standard HDD physical form factor, e.g., 2.5", 3.5", etc. The apparatus 502 includes magnetic disks 502 upon which first and second volumes 506, 508 are stored. The disks 502 may be access by multiple actuators using any combination of arrangements shown in FIGS. 1-4. As indicated by solid line 507, the first volume 506 is used by the host 504 as a conventional drive e.g., for formatting, storing, and retrieving data. As indicated by the dashed line 509, the second volume 508 may or may not be accessible via the host interface 503. If not, the second volume 508 may be entirely managed via a controller of the apparatus 502 and unavailable to the host 504, or the host 504 may access the second volume 508 via a different interface (not shown).

If the second volume 508 can be accessed via the host interface 503, then it may be presented as a separate logical volume, e.g., using an identifier such as logical unit number (LUN) used with the SCSI protocol. In other embodiments, the second volume 508 may be accessed via a known logical block address (LBA) range. In either event, assuming the data on the second volume 508 is managed internally by the apparatus 502, the host 504 may be limited in operations performed on the second volume 508. For example, the volume 508 may be presented as read-only so that the host 504 can access backed-up data but not overwrite such data or write new data.

The data stored on the first volume 506 by the host 504 may include partition data 506a, which may include data such as partition tables and master boot records. Filesystem metadata 506b includes data used by a particular filesystem (e.g., NTFS, ext4) that describe the content and arrangement of the files of user data 506c. Examples of the content descriptors of filesystem metadata 506b include the LBAs used to store the file, filenames, file sizes, file permissions, creation/modification dates, etc. Examples of arrangement descriptors of the filesystem metadata 506b include directory names and content, hard/soft links, etc.

The second volume 508 may be used to store any combination of the different data types 506a-c stored in the first volume 506, as indicated by blocks 508a-c. The data 508a-c may be stored as exact, sector-by-sector copies of data 506a-c, or may use different formatting and/or compression than data 506a-c. The second volume 508 may store additional, internally generated data, as indicated by parity data 508d. The parity data 508d can be used similar to RAID-5 or RAID-6 parity, such that data can be reconstructed using a parity algorithm if some data on first volume 506 is lost. For example, the data stored in two different data sectors (e.g., selected from different regions of volume 506) can be combined to form parity data which is stored in a parity sector. If one of the data sectors is lost, it can be recovered using the other sector and the parity sector.

Note that the second volume 508 does not need to store all the data from the first volume 506. For example, just the partitioning and filesystem metadata 506a-b may be fully backed up to blocks 508a-b. In such a case, the user data 506c may not be backed up, may be backed up in a compressed format on block 508c and/or parity data 508d stored. In this way, the second volume 508 can be made smaller than the first volume 506, which increases the storage capacity available to the host 504.

During operation, the apparatus 502 can check and maintain the integrity of data stored in the second volume 508 by performing background validation operations on some or all of the data 508a-d. The validation operations may include reading sectors to ensure no read errors, and occasionally rewriting sectors if, e.g., a bit error rate of recoverable sectors is high. If unrecoverable errors are found on the second volume 508, the first volume 506 may be used to find and recover the lost data. The rewriting of data on the second volume 508 may also occur if recent activity suggests that data sectors may be at risk of higher errors. For example, multiple rewrites of adjacent tracks may increase the likelihood that adjacent track interference will increase error rate of a target track. These validation operations may also occur on the first volume 506, although potentially at a lower frequency to minimize performance impacts and/or only in response to a triggering event unrelated to scheduling or elapsed time.

At least some of background validation operations performed on the second volume 508 are not performed on the first volume 506 (at least at regular intervals). This increases availability to service host requests and thereby minimizes performance impacts on the first volume 506. If an error (e.g., bad sector) is found on the first volume 506 in response to a host request, then the second volume 508 can be accessed to recover the sector. In some cases, it may be faster to read a copy of the data from the second volume 508 rather than attempting a directed error recovery operation on bad sectors of the first volume 506. Such directed error recovery can sometimes recover data from the sector without relying on the backup volume, but can be time-consuming and so recovering directly from the second volume 508 can improve performance.

In some conditions, an error found on the second volume 508 may be used to test for similar errors of the first volume 506. For example, if the volumes 506, 508 are mirrors that are written at the same time, a mechanical shock event or some other disturbance that occurred during writing might affect the same sectors on both volumes. As the second volume 508 would be more likely to discover this error first, e.g., due to background or immediate write verify, it may be able to recover lost data before it is requested by the host. In other cases, over time certain bit patterns may result in higher-than average errors upon reading back. This trend may be found on the second volume 508 via background validation, and can be used to mitigate future problems (e.g., by adjusting write channel parameters) and to test affected sectors of the first volume 502 to determine whether scrubbing of those sectors is needed.

Figure 6:
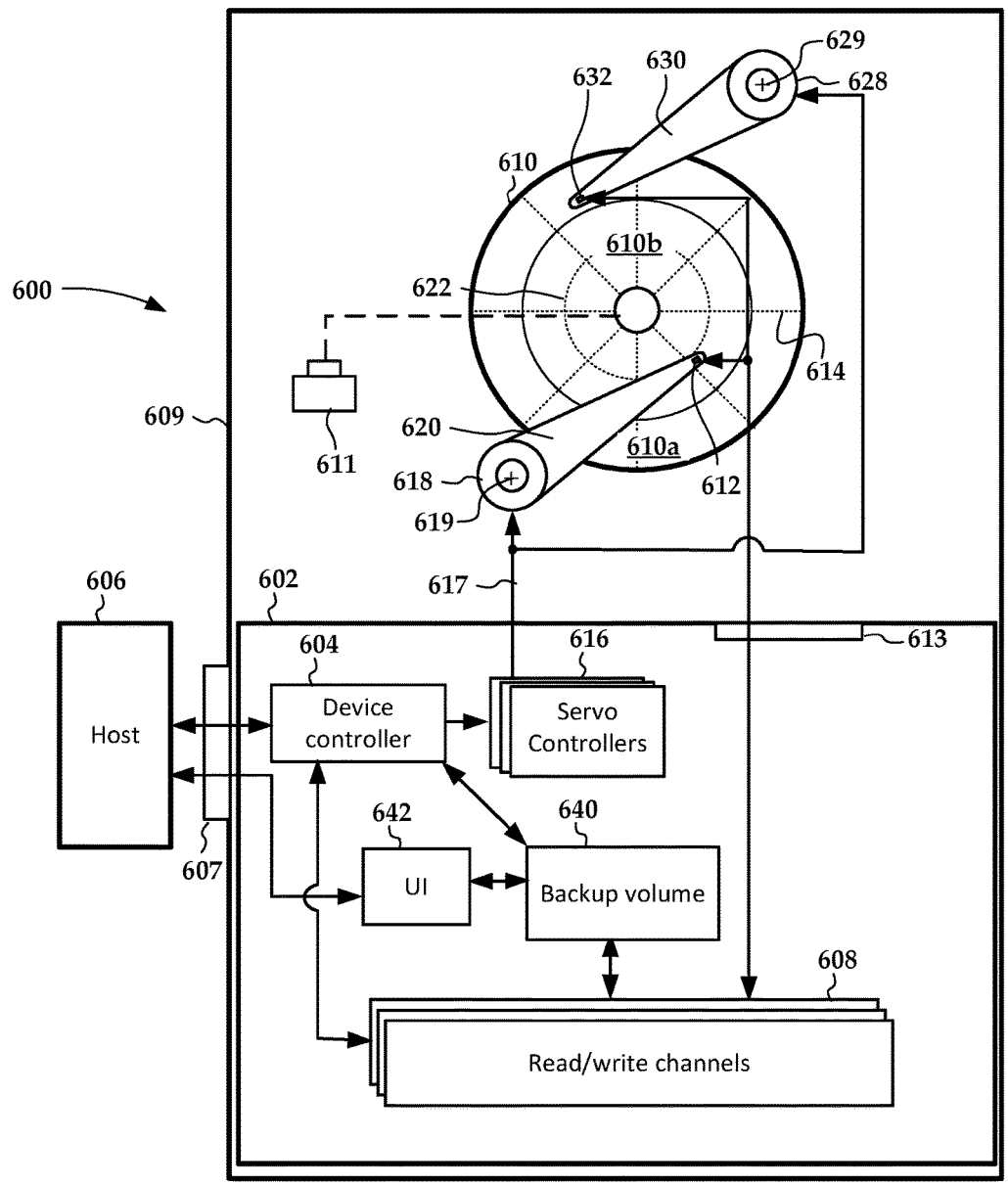
FIG. 6 is a block diagram of a system and apparatus according to an example embodiment.

In FIG. 6, a block diagram illustrates a data storage drive 600 that utilizes one or more actuators according to example embodiments. The apparatus includes circuitry 602 (e.g., one or more circuit boards) such as one or more device controllers 604 that process read and write commands and associated data from a host device 606 via a host interface 607. The host interface 607 includes circuitry that enables electronic communications via standard bus protocols (e.g., SATA, SAS, etc.). The host device 606 may include any electronic device that can be communicatively coupled to store and retrieve data from a data storage device, e.g., a computer, a server, a storage controller. The device controller 604 is coupled to one or more read/write channels 608 that read from and write to surfaces of one or more magnetic disks 610 that are driven by a motor 611. The disks 610 and circuits 602 are contained within or attached to a single hard disk drive enclosure 609.

The read/write channels 608 generally convert data between the digital signals processed by the device controller 604 and the analog signals conducted through two or more heads 612, 632 during read operations. The two or more heads 612, 632 each may include respective read transducers capable of concurrently reading the disk 610, e.g., at least two heads reading from the same surface. The two or more heads 612, 632 may also include respective write transducers that concurrently write to the disk 610. The write transducers may be conventional magnetic recording (CMR), heat-assisted magnetic recording (HAMR), microwave assisted magnetic recording (MAMR), and may write in various track configurations, such as conventional, SMR, and IMR.

The read/write channels 608 are coupled to the heads 612, 632 via interface circuitry 613 such as preamplifiers, digital-to-analog converters, analog-to-digital converters, etc. As shown in the figure, the read/write channels 608 may be capable of concurrently processing one of a plurality of data streams from the multiple heads 612, 632. In addition to processing user data, the read/write channels 608 read servo data from servo marks 614 on the magnetic disk 610 via the read/write heads 612, 632. The servo data are sent to one or more servo controllers 616 that use the data to provide position control signals 617 to one or more actuators, as represented by voice coil motors (VCMs) 618. The VCM 618 rotates an arm 620 upon which the read/write heads 612 are mounted in response to the control signals 617. The position control signals 617 may also be sent to microactuators (not shown) that individually control each of the heads 612, e.g., causing small displacements at each read/write head.

The VCM 618 may be a stacked or split actuator, in which case two VCM parts are configured to independently rotate different arms about a common axis 619. In such a case, other heads (not shown) will access data on the disks simultaneously with that of heads 612, and these other heads may be coupled to circuitry 602 similar to illustrated head 632. A second actuator, e.g., VCM 628, may independently and simultaneously rotate a second arm 630 about a second axis 629. Corresponding heads 632 may be rotated by the VCM 628 and may operate simultaneously with the heads 612 under commands from the one or more servo controllers 616. A microactuator (not shown) may also be used on arm 630 to cause fine displacements of head 632.

A backup module 640 manages the assignment of heads 612, 632 to particular zones 610a-b of the disk 610. While the zones 610a-b are shown as parts of a single disk surface, in other embodiments different zones may cover whole disk surfaces. One of the zones 610a-b is designated as a primary volume and another of the zones 610a-b is designated as a backup volume. For example, the backup module 640 may form a first drive volume of the one or more disks 610 that is read from and written to by the first actuator 618 and form a second drive volume of the one or more disks 610 that duplicates data of the first drive volume. The backup module 640 may determine the parameters of the zones 610a-b during an initial configuration of the drive 600, e.g., the partitioning and formatting of the zones 610a-b.

An optional user interface module 642 may be used to allow and end-user set the zone configurations, e.g., via the host interface using legacy commands, or via an alternate interface (e.g., serial line input). The user interface module 642 may allow an end user to specify a particular configuration, such as direct mirror, compressed backup, parity-only, etc. During operation, the backup module 640 may perform background validation operations on the second (backup) drive volume and not the first volume.

Figure 7:
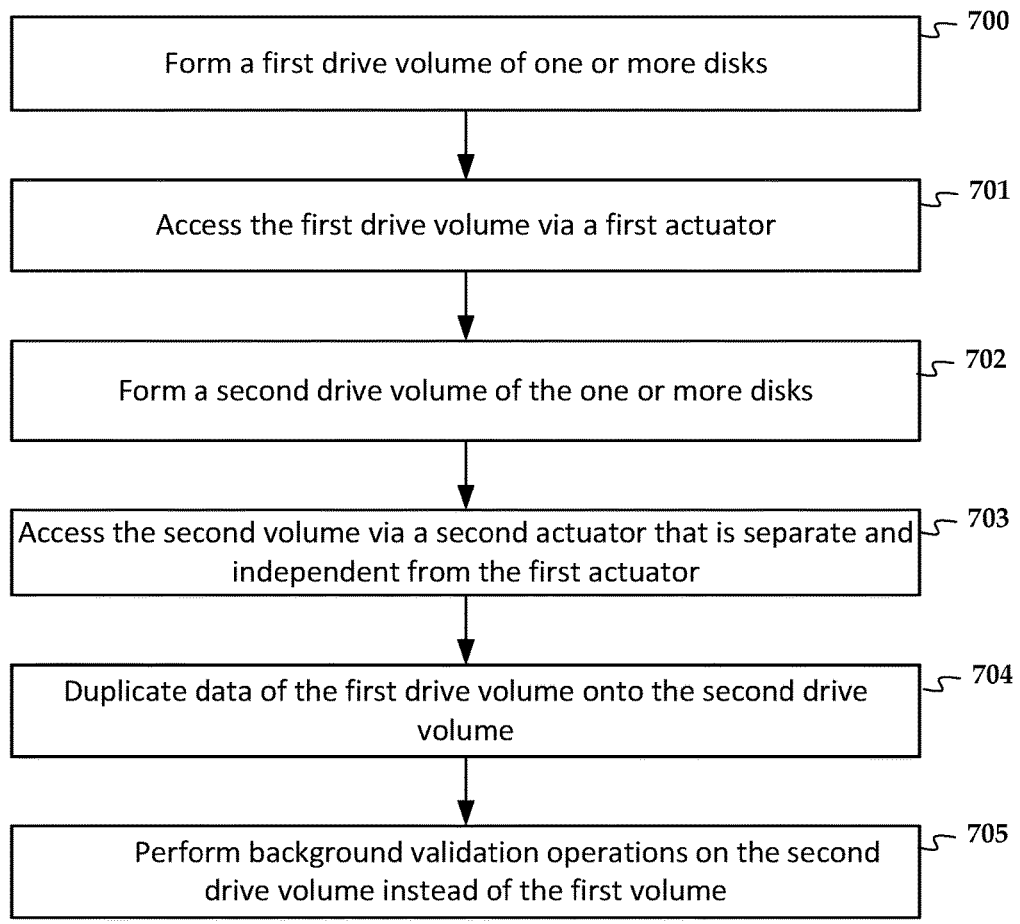
FIG. 7 is a flowchart of a method according to an example embodiment.

In FIG. 7, a flowchart shows a method according to an example embodiment. The method involves forming 700 a first drive volume of one or more disks of a data storage drive. For example, a first portion of the disks may be reserved and defined for the first volume. The first drive volume is accessed 701 by (e.g., read from and written to) via a first read/write head that is moved by a first actuator. A second drive volume of the one or more disks is formed 702, e.g., by reserving and defining a second portion of the disks for the second volume. The second volume is accessed 703 via a second read/write head that is moved via a second actuator. The second actuator is separate and independent from the first actuator. The first and second actuators and one or more disks are all enclosed within a common drive enclosure, e.g., an enclosure conforming to a hard disk drive form factor.

Data of the first drive volume is duplicated 704 onto the second drive volume, e.g., in real time or via background processes. Background validation operations are performed 705 on the second drive volume instead of the first volume. For example, this may include performing operations at a greater frequency on the second volume than the first volume. In some configurations, this may include performing certain operations regularly in background on the second volume, where the same operations are only performed on the first volume in response to an error or other triggering event besides elapsed time.

The various embodiments described above may be implemented using circuitry, firmware, and/or software modules that interact to provide particular results. One of skill in the relevant arts can readily implement such described functionality, either at a modular level or as a whole, using knowledge generally known in the art. For example, the flowcharts and control diagrams illustrated herein may be used to create computer-readable instructions/code for execution by a processor. Such instructions may be stored on a non-transitory computer-readable medium and transferred to the processor for execution as is known in the art. The structures and procedures shown above are only a representative example of embodiments that can be used to provide the functions described hereinabove.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A data storage drive comprising:
   interface circuitry configured to communicate with:
   first and second actuators enclosed within the drive that operate independently; and
   first and second read/write heads enclosed within the drive and respectively moved over one or more disks by the first and second actuators, the one or more disks driven by a single spindle motor enclosed within the drive; and
   a controller coupled to the interface circuitry and operable to:
   form a first drive volume of the one or more disks that is read from and written to by the first read/write head;
   form a second drive volume of the one or more disks that that is read from and written to by the second read/write head, the second volume duplicating data of the first drive volume; and
   perform background validation operations on the second drive volume and not the first drive volume.

2. The data storage drive of claim 1, wherein performing the background validation operations on the second drive volume and not the first volume minimizes performance impacts on the first volume.

3. The data storage drive of claim 1, the controller is further operable to use errors found on the second volume from the background validation operations to test for similar errors on the first volume.

4. The data storage drive of claim 1, wherein the second volume is a mirror of the first volume.

5. The data storage drive of claim 1, second volume comprises data of the first volume stored in a reduced format.

6. The data storage drive of claim 1, wherein the second volume comprises parity data calculated based on data from different sectors of the first volume.

7. The data storage drive of claim 1, wherein the background validation operation comprises reading data written to the second drive volume and determining unrecoverable errors.

8. The data storage drive of claim 1, wherein the background validation operation comprises reading data written to the second drive volume and determining recoverable errors.

9. The data storage drive of claim 1, wherein the first and second actuators move about separate pivots and at least part of the first volume and at least part of the second volume are located on two or more radially defined zones located on a same surface of the one or more disks such that the second head can read from the first volume in parallel with the first head to increase throughput of a host data request.

10. The data storage drive of claim 9, wherein the two or more radially defined zones comprise four or more zones divided into two sets, the zones of each of the two sets being interleaved and distributed from an inner diameter to an outer diameter of the one or more disks.

11. The data storage drive of claim 1, wherein the first and second actuators move about a common pivot and at least part of the first volume and at least part of the second volume are located on entire, different surfaces of the one or more disks.

12. A method comprising:
   forming a first drive volume of one or more disks within a drive enclosure of a hard disk drive, the one or more disks driven by a single spindle motor being enclosed within the drive enclosure, the first drive volume being read from and written to by a first read/write head that is moved by a first actuator within the drive enclosure;
   forming a second drive volume of the one or more disks that that is read from and written to by a second read/write head that is moved via a second actuator within the drive enclosure that is separate and independent from the first actuator;
   duplicating data of the first drive volume onto the second drive volume; and
   performing background validation operations on the second drive volume instead of the first volume.

13. The method of claim 12, further comprising to using errors found on the second volume from the background validation operations to test for similar errors on the first volume.

14. The method of claim 12, further comprising reading from the first volume in parallel with the first and second heads to increase throughput of a host data request.

15. A hard disk drive comprising:
one or more magnetic disks in a drive enclosure that are driven by a single spindle motor enclosed within the drive enclosure;
first and second actuators within the drive enclosure that independently move respective first and second heads over the one or more magnetic disks; and
a controller coupled to the first and second actuators and first and second heads and operable to:
  define a first volume on a first portion of the one or more disks, the first portion being read from and written to by the first read/write head;
  define a second volume on a second portion of the one or more disks, the second portion being read from and written to by the second read/write head;
  in response to data being written to the first volume, duplicate the data to the second drive volume; and
  perform background validation operations on the second volume instead of the first volume.

16. The hard disk drive of claim 15, wherein the first and second actuators move about separate pivots, and wherein at least part of the first volume and at least part of the second volume are located on a same surface of the one or more disks.

17. The hard disk drive of claim 16, wherein the second head can read from the first volume in parallel with the first head to increase throughput of a host data request.

18. The hard disk drive of claim 15, wherein the second volume is a mirror of the first volume.

19. The hard disk drive of claim 15, wherein duplicating the data to the second volume comprises compressing the data stored on the second volume.

20. The hard disk drive of claim 15, wherein a host computer is given full access to the first volume and limited access to the second volume.

\* \* \* \* \*